(12) United States Patent
Zhao

(10) Patent No.: US 10,099,435 B2
(45) Date of Patent: Oct. 16, 2018

(54) METHOD OF SPLITTING FIBER TOWS

(71) Applicant: Ford Global Technologies, LLC, Dearborn, MI (US)

(72) Inventor: Haibo Zhao, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 14/730,828

(22) Filed: Jun. 4, 2015

(65) Prior Publication Data

US 2016/0355976 A1 Dec. 8, 2016

(51) Int. Cl.
*B29C 70/50* (2006.01)
*D07B 1/02* (2006.01)
(Continued)

(52) U.S. Cl.
CPC ............... *B29C 70/50* (2013.01); *D07B 1/02* (2013.01); *B29K 2025/06* (2013.01);
(Continued)

(58) Field of Classification Search
CPC .. B29C 70/50; D07B 1/02; D07B 2201/1024; D07B 2205/3007; D07B 2205/2089; D07B 2201/2012; B29K 2025/06; B29K 2307/04; B29K 2105/10; B29L 2007/008; D01D 10/02; D01D 11/02; D01D 11/06; D01F 9/12; D01F 11/00; D01F 11/14; D01F 11/16; D01G 1/10; D01G 1/04; D06M 10/001; D06M 10/003; D06M 10/006; D06M 10/02; D06M 10/025; D06M 10/10; D06M 2101/40; C03C 25/10–25/226
See application file for complete search history.

(56) References Cited

U.S. PATENT DOCUMENTS 3,156,752 A * 11/1964 Passmore ........... D01D 10/0481
19/299
3,596,319 A * 8/1971 McKenica ............... D01D 5/26
425/308
(Continued)

OTHER PUBLICATIONS

Khokar, N. et al., "Advantages of Ultralight Woven Spread Tow Fabrics, Proceedings of the 2nd International Conference on Carbon Composites", Oct. 2010, 8 pgs., Arcachon, France.
(Continued)

*Primary Examiner* — Jeffrey M Wollschlager
(74) *Attorney, Agent, or Firm* — Brooks Kushman P.C.

(57) ABSTRACT

A fiber tow and methods for separating a fiber tow are disclosed. The fiber tow may include adjacent filaments and a polymer coating covering at least a portion of the adjacent filaments. The polymer coating may include a polymer that is configured to contract in a direction generally parallel to the adjacent filaments and expand in a direction generally perpendicular to the adjacent filaments. The polymer coating may contract/expand in response to an energy source, such as heat or a UV light source. The methods may include coating at least a portion of a plurality of filaments with a polymer, bundling the filaments into a fiber tow, and exposing the fiber tow to an energy source to contract the polymer in a direction generally parallel to the filaments and to expand the polymer in a direction generally perpendicular to the filaments. The filaments may be carbon fiber filaments.

16 Claims, 3 Drawing Sheets

(51) Int. Cl.
   *B29K 25/00* (2006.01)
   *B29K 307/04* (2006.01)
   *B29L 7/00* (2006.01)
   *B29K 105/10* (2006.01)

(52) U.S. Cl.
   CPC ...... *B29K 2105/10* (2013.01); *B29K 2307/04* (2013.01); *B29L 2007/008* (2013.01); *D07B 2201/1024* (2013.01); *D07B 2201/2012* (2013.01); *D07B 2205/2089* (2013.01); *D07B 2205/3007* (2013.01)

(56) References Cited

U.S. PATENT DOCUMENTS

| | | | | |
|---|---|---|---|---|
| 3,980,484 A * | 9/1976 | Shaw | ................ | C04B 20/0008 106/711 |
| 4,015,994 A * | 4/1977 | Hill | ................ | C03C 13/002 106/711 |
| 4,043,779 A * | 8/1977 | Schaefer | ................ | C03B 37/03 118/36 |
| 4,045,196 A * | 8/1977 | Schaefer | ................ | B26D 1/62 65/452 |
| 4,806,298 A * | 2/1989 | Wilkinson | ................ | B26D 7/2614 118/36 |
| 4,840,755 A * | 6/1989 | Nakazawa | ................ | C03B 37/14 264/143 |
| 5,192,387 A * | 3/1993 | Buckley | ................ | B29B 11/16 156/275.5 |
| 5,447,793 A * | 9/1995 | Montsinger | ................ | B29C 70/50 118/110 |
| 5,582,786 A * | 12/1996 | Brunskill | ................ | C08J 5/18 264/103 |
| 5,601,882 A * | 2/1997 | Augier | ................ | C03B 37/16 156/275.5 |
| 5,653,534 A * | 8/1997 | Matsumoto | ................ | B29C 45/1816 366/76.1 |
| 5,801,387 A * | 9/1998 | Nablo | ................ | H01J 33/00 250/398 |
| 6,099,910 A * | 8/2000 | Woodside | ................ | B29B 15/122 427/386 |
| 6,106,761 A * | 8/2000 | Sjoberg | ................ | B32B 1/08 250/492.1 |
| 6,228,314 B1 * | 5/2001 | Trueblood | ................ | B29C 71/04 264/485 |
| 6,365,090 B1 * | 4/2002 | Strait | ................ | C03B 37/14 264/143 |
| 6,897,260 B2 | 5/2005 | Vynckier | | |
| 7,832,983 B2 | 11/2010 | Kruckenberg et al. | | |
| 8,057,614 B2 | 11/2011 | Haque | | |
| 9,731,455 B2 * | 8/2017 | Meredith | ................ | B07C 5/368 |
| 2002/0108699 A1 * | 8/2002 | Cofer | ................ | C03C 25/26 156/176 |
| 2003/0075535 A1 * | 4/2003 | Kubodera | ................ | C23C 16/4411 219/390 |
| 2009/0208742 A1 * | 8/2009 | Zhu | ................ | D06M 15/333 428/367 |
| 2010/0159240 A1 | 6/2010 | Shah et al. | | |
| 2011/0123735 A1 | 5/2011 | Shah et al. | | |
| 2011/0186775 A1 | 8/2011 | Shah et al. | | |
| 2012/0009841 A1 * | 1/2012 | Knack | ................ | B01D 39/1623 442/408 |
| 2012/0048082 A1 * | 3/2012 | Silva | ................ | B26D 1/22 83/39 |
| 2012/0280430 A1 | 11/2012 | Jones | | |
| 2013/0224470 A1 * | 8/2013 | Vautard | ................ | C08J 5/06 428/300.1 |
| 2014/0262088 A1 | 9/2014 | Deka | | |
| 2015/0273736 A1 * | 10/2015 | Schneider | ................ | B29B 11/16 264/101 |
| 2016/0059450 A1 * | 3/2016 | Meredith | ................ | B07C 5/368 264/40.1 |
| 2016/0258319 A1 * | 9/2016 | Turner | ................ | F01D 9/041 |

OTHER PUBLICATIONS

Harper, L. T., "Discontinuous Carbon Fibre Composites for Automotive Applications", The University of Nottingham, Aug. 2006, pp. 1-348.

* cited by examiner

METHOD OF SPLITTING FIBER TOWS

TECHNICAL FIELD

This disclosure relates to a method of splitting fiber tows, for example, carbon fiber tows.

BACKGROUND

Increased fuel economy is an important goal for vehicle manufacturers. The desire for improved fuel economy may be driven by fuel costs, emissions standards (e.g., for carbon dioxide), improved range, or other reasons. One approach to improving fuel economy is using lightweight materials to reduce vehicle weight. Carbon fiber is a low-density material with good mechanical properties. Currently, carbon fiber is generally used applications such as aerospace, wind energy, sporting goods, and high-end vehicles. These applications are generally lower in volume and higher in price compared to high-volume vehicles. Implementation of carbon fiber into high-volume, non-luxury vehicles in the auto industry includes challenges.

One of the challenges is developing low-cost processing technology for high-volume production. A sheet molding compound (SMC) process has been used to manufacture glass fiber reinforced parts, such as decklids, hoods, bumpers, and others. However, the same SMC process may not be suitable for carbon fibers due to differences in physical properties. Carbon fibers may be smaller in diameter compared with glass fibers (e.g., twice as small), which can make carbon fiber tows difficult to separate. In addition, sizing materials that may be coated on the carbon fiber surface can make carbon fibers tend to agglomerate.

SUMMARY

In at least one embodiment, a fiber tow is provided comprising adjacent filaments and a polymer coating covering at least a portion of the adjacent filaments. The polymer coating may include a polymer that is configured to contract in a direction generally parallel to the adjacent filaments and expand in a direction generally perpendicular to the adjacent filaments. The contraction and expansion may be independent of the adjacent filaments.

In one embodiment, the polymer is configured to contract in a direction parallel to the adjacent filaments and expand in a direction perpendicular to the adjacent filaments when exposed to a heat source. In another embodiment, the polymer is configured to contract in a direction parallel to the adjacent filaments and expand in a direction perpendicular to the adjacent filaments when exposed to a UV light source.

The filaments may be carbon fiber filaments. In one embodiment, the fiber tow is a fiber tow segment having a length of 1 to 100 mm. The polymer may include a blend of polystyrenes, high impact polystyrenes, and elastomers. In one embodiment, the polymer is configured to expand at least 25% in the direction generally perpendicular to the adjacent filaments such that a diameter of the fiber tow expands at least 25% when the polymer is exposed to an energy source. In another embodiment, the polymer is configured to expand in the direction generally perpendicular to the adjacent filaments such that gaps are formed between the adjacent filaments when the polymer is exposed to an energy source. The polymer may directly contact the portion of the adjacent filaments.

In at least one embodiment, a method of separating filaments in a fiber tow is provided. The method may include coating at least a portion of a plurality of filaments with a polymer, bundling the filaments into a fiber tow, and exposing the fiber tow to an energy source to contract the polymer in a direction generally parallel to the filaments and to expand the polymer in a direction generally perpendicular to the filaments.

The plurality of filaments may be carbon fiber filaments. In one embodiment, the energy source is a heat source. The heat source may heat the fiber tow to a temperature of 50° C. to 250° C. In another embodiment, the energy source is a UV light source. The method may further include cutting the fiber tow into a plurality of fiber tow segments and the exposing step may include exposing the fiber tow segments to the energy source.

In one embodiment, the method may include cutting the fiber tow into a plurality of fiber tow segments and dropping the fiber tow segments onto a receiving surface. The exposing step may include exposing the fiber tow segments to the energy source during at least a portion of the dropping step. In one embodiment, the receiving surface may be a carrier film having a resin applied thereon. The method may further include forming a sheet molding compound including the fiber tow segments.

In at least one embodiment, a sheet molding compound is provided. The sheet molding compound may include first and second spaced apart carrier films and a plurality of fiber tow segments disposed between the first and second carrier films. Each segment may include a plurality of spaced apart filaments connected by a plurality of spaced apart polymer portions. Resin may be disposed between the first and second carrier films and within gaps formed between the polymer portions. In one embodiment, the plurality of spaced apart filament are carbon fiber filaments.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As described in the Background, the SMC process used to manufacture glass fiber reinforced parts may not be suitable for producing carbon fiber reinforced parts. The bundling of carbon fibers can cause issues in the SMC process. For example, it may be difficult for resin to wet out (e.g., fully impregnate) the carbon fibers and the fibers may not flow well during molding. Due to these issues, carbon fiber reinforced SMC parts have not yet met the required mechanical performance. An economical and effective method to improve the carbon fiber separation in the carbon fiber SMC process may improve final part performance.

Figure 1:
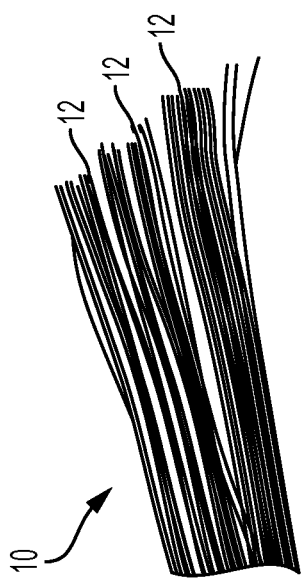
FIG. 1 is an example of a carbon fiber tow.

An example of a partially separated carbon tow 10 is shown in FIG. 1. A carbon tow is a bundle of individual carbon fiber filaments or strands 12 that form a larger strand. Carbon tows may be woven together into cloth or a weave. Carbon tows may be defined or classified by size, such as 3k, 6k, 12k, 24k, 36k, 48k, or higher, where the "k" represents a thousand filaments. For example, a 12k carbon tow may include 12,000 carbon filaments. Carbon tows may come in a variety of sizes, and the size chosen may depend on the application. The diameter of the filaments may also vary depending on the desired properties or the application. The diameter of the filaments may vary, for example, from 1 to 25 microns, or sub-ranges therein, such as 5 to 15 microns or 5 to 10 microns.

The production of carbon fiber and carbon fiber tows is known in the art, and will not be described in detail. In general, the production of carbon fiber tows includes the steps of polymerization, spinning, oxidation, carbonization, and surface treatment. However, there are multiple methods for producing carbon fiber tows and any method may be compatible with the present disclosure. Polymerization generally includes converting a polymeric feedstock (e.g., precursor) into a material that can be formed into fibers. In general, fibers may be formed from polyacrylonitrile (PAN), made from acrylonitrile, however fiber may also be formed from other precursors such as rayon or pitch-based precursors. The precursor may be in a powder form and may be dissolved in a solvent, such as an organic or aqueous solvent, to form a slurry.

Fibers may be formed by spinning, such as wet spinning. The slurry may be immersed in a coagulant and extruded through holes in a bushing or spinneret having a number of holes that matches the desired filament count of the tow. The wet-spun fiber may be washed, dried, and stretched. While wet spinning is one approach to forming carbon fibers, others known in the art may also be used. After drying, the fibers may be wound, for example, onto bobbins.

The fibers, which may be wound or rolled, may then be inserted or fed through one or more ovens during the oxidation step. The oxidation temperature may range from about 200° C. to 300° C. The process may cause the polymer chains to crosslink and increase in density. The oxidized fibers may contain about 50 to 65 percent carbon molecules after oxidation, with elements such as hydrogen, nitrogen and oxygen forming the balance.

In the carbonization step, the fibers are heated again but in an inert or oxygen-free atmosphere. Without oxygen, non-carbon molecules are removed from the fibers. The carbonization step may include heating at one or more temperatures, for example, a first, lower temperature and a second, higher temperature. The temperatures may range, for example, from 700° C. to 1500° C. The fibers may held in tension throughout the production process. During carbonization, crystallization of the carbon molecules occurs and the finished fiber may be more than 90 percent carbon.

After carbonization, the fibers may receive a surface treatment and/or a coating named sizing. The surface treatment may include pulling the fiber through an electrochemical or electrolytic bath that contains solutions to etch or roughen the surface of each filament. A coating, generally called sizing, may then be applied to the fibers. The sizing is intended to protect the carbon fibers during handling and processing so that the fiber surfaces are not scratched or damaged. After the sizing is applied and has dried, the fiber tows are generally bundled or wound-up for later use (e.g., on bobbins).

In order to form a carbon fiber reinforced SMC component, it may be beneficial to separate or split the carbon fiber tow (e.g., the finished tow) into individual filaments. This may improve wet-out of the filaments, leading to improved properties of the SMC component (e.g., load transfer). Previous approaches to splitting the tows have included mechanical methods to physically separate the fiber filaments. These methods can damage the fiber surface during the process and generally only split large fiber tows into relatively smaller fiber tows.

With reference to FIGS. 2-5, embodiments of a method for separating or splitting fiber tows are shown. In addition, embodiments of a system for splitting fiber tows are described, as well as components formed from split fiber tows. While the embodiments may be described using carbon tows as an example, other types of fiber tows may be used in the methods, systems, and components and such use is contemplated herein. For example, glass fiber tows, ceramic fiber tows, polymer fiber tows, or others may be used.

Figure 2:
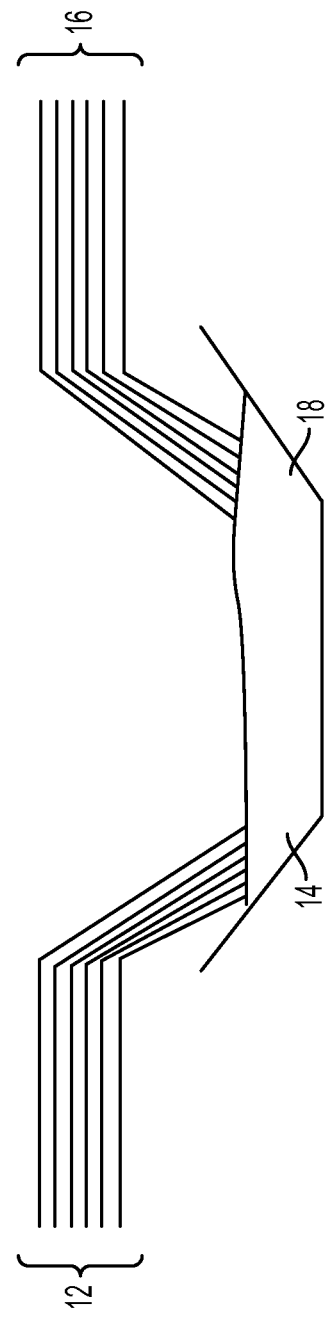
FIG. 2 is a schematic of a process of coating a plurality of filaments with a polymer, according to an embodiment.

With reference to FIG. 2, a plurality of individual filaments 12 may be coated by a polymer 14 to form coated filaments 16. The filaments 12 may be coated by the polymer 14 in any suitable manner. For example, as shown in FIG. 2, the filaments 12 may be passed through a bath 18 of the polymer 14. Other examples of coating the filaments 12 may include dipping or immersing the filaments 12 in the polymer 14 or spraying the polymer 14 onto the filaments 12. The filaments 12 may be coated with the polymer 14 before being bundled into a tow 100 (e.g., the filaments 12 are still separated by gaps). In one embodiment, the filaments 12 may be coated with the polymer 14 after the filaments 12 are formed from a precursor (e.g., PAN) but prior to being bundled wound onto rolls or bobbins for storage and later use. For example, the filaments 12 may be coated with the polymer 14 after the carbonization step. The filaments 12 may be coated with the polymer 14 before or after the surface treatment and/or sizing step in the fiber production process. In one embodiment, the polymer 14 may replace the typical sizing coating.

Figure 3:
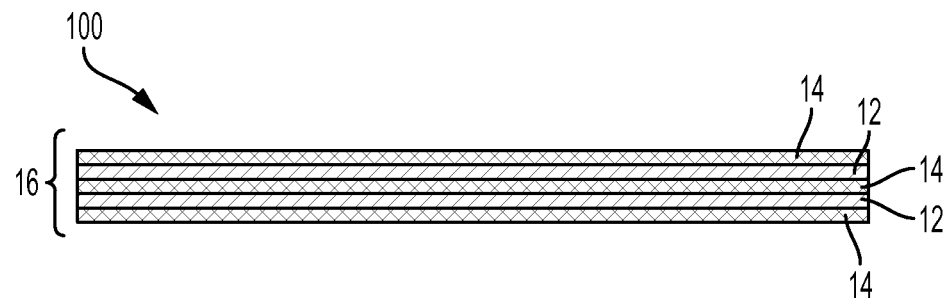
FIG. 3 is a schematic of a fiber tow including polymer-coated filaments, according to an embodiment.

With reference to FIG. 3, a fiber tow 100 including coated filaments 16 is shown. For simplicity, only two filaments 12 are shown, each coated with the polymer 14. However, the fiber tow 100 may have any suitable number of filaments 12 therein, such as 3,000 (3k), 6,000 (6k), 12,000 (12k), 24,000 (24k), 36,000 (36k), 48,000 (48k), or any other number of filaments 12. In one embodiment, the fiber tow 100 may have from 12,000 to 48,000 filaments. While the coated filaments 16 are shown with the filaments 12 completely covered by polymer 14, the coating may be discontinuous such that there are portions of the filaments 12 that are not coated with polymer 14. In addition, each filament 12 may be coated by polymer 14 or some filaments may be uncoated. The degree of coating (e.g., percent of each filament coated and percent of number of filaments coated) may depend on the coating process. For example, if the filaments 12 are passed through a bath, the degree of coating may increase with longer bath dwell times (e.g., larger bath or slower tow speed). If the filaments 12 are immersed in a bath (e.g., statically), the degree of coating may depend on the immersion time. Accordingly, at least a portion of the filaments 12 may be coated with polymer 14, and each filament 12 that is coated may be at least partially coated with polymer 14.

In at least one embodiment, the polymer 14 may change its shape when exposed to one or more conditions or stimuli. These polymers may be referred to as stimuli-responsive polymers or "smart polymers," and may react to change their shape when exposed to stimuli such as temperature, light, humidity, pH, or an electrical or magnetic field. Polymers that react to stimuli by changing their shape may be referred to as shape-memory polymers. In at least one embodiment, the polymer 14 may be configured to shrink or shorten in length and expand or increase in thickness when exposed to a stimulus, such as those described above. For example, the stimulus may be an energy source such as heat or light. Length may be defined as the direction parallel to the filaments 12 and thickness may be defined as the direction perpendicular to the filaments 12 (e.g., radial direction). In one embodiment, the energy source may be heat. In another embodiment, the energy source may be a certain light frequency, such as ultraviolet (UV) light.

Any polymer 14 that exhibits the described change in shape may be used. Non-limiting examples of polymers that may shrink in length and expand in thickness in response to heat may include polystyrenes, high impact polystyrenes, elastomers, or blends thereof, such as those described in U.S. Pat. No. 6,897,260, the disclosure of which is hereby incorporated in its entirety by reference herein. Another example may include physically crosslinked linear block copolymers of polyurethanes with ionic or mesogenic components, polyethylene terephthalate (PET) and polyethyleneoxide (PEO), polystyrene and poly(1,4-butadiene), and poly(2-methyl-2-oxazoline) and polytetrahydrofuran. Chemically crosslinked polyurethane or PEO-PET block copolymers may also be used. Another example may include polyether ether ketone (PEEK).

Additional processing steps may increase the expansion/contraction of the polymer 14. For example, additional steps such as heat treatments, cooling steps, orienting/stretching steps, and/or annealing steps may be performed. The temperature or amount of heat at which the polymer changes shape may vary depending on the composition. In one embodiment, the temperature may be from 50° C. to 250° C., or any sub-range there, such as 80° C. to 200° C., 100° C. to 150° C., or 100° C. to 125° C. The length of time required for the polymer to change shape may vary depending on the composition. The polymer may be heated for under a second, a second, or several seconds to several minutes. For example, the polymer may be heated for 0.1 seconds to 5 minutes, or any sub-range therein, such as 0.1 seconds to 3 minutes, 0.1 seconds to 60 seconds, 0.5 seconds to 45 seconds, 0.5 seconds to 30 seconds, 0.5 seconds to 15 seconds, or 1 to 10 seconds.

In embodiments where UV light is the stimulus or energy source, any polymer that exhibits a change in shape in response to UV light may be used (e.g., any polymer that exhibits UV light-induced actuation) Such polymers may be known as Light activated shape memory polymers (LASMPs). Non-limiting examples of polymers that may shrink in length and expand in thickness in response to UV light may include those including cinnamic groups, such as cinnamic acid or cinnamylidene acetic acid, $TiO_2$-polystyrene shape memory nanocomposites, $Zn(Mebip)_2(NTf_2)_2$ (a metallosupramolecular unit formed by coordinating 2,6-bis (N-methyl-benzimidazolyl)-pyridine (Mebip) ligands to zinc di[bis(trifluoromethylsulfonyl)-imide] $(Zn(NTf_2)_2)$) and epoxy resin, amd EVA films doped with 0.1% to 3% spiropyran. The specific wavelength of UV light and the duration of exposure necessary for the polymer to change shape may vary depending on the composition. In one embodiment, the wavelength may be from 100 nm to 400 nm. For certain UV light-actuated polymers, a first wavelength may set a new shape of the polymer and a second wavelength may return the polymer to its original shape. For example, polymers with cinnamic groups may be set using light with a wavelength of over 260 nm and then returned to their original shape using a light with a wavelength of less than 260 nm. Additional processing steps may facilitate or increase the expansion/contraction of the polymer 14. For example, additional steps such as heat treatments or curing, cooling steps, orienting/stretching steps, and/or annealing steps may be performed.

Figure 4:
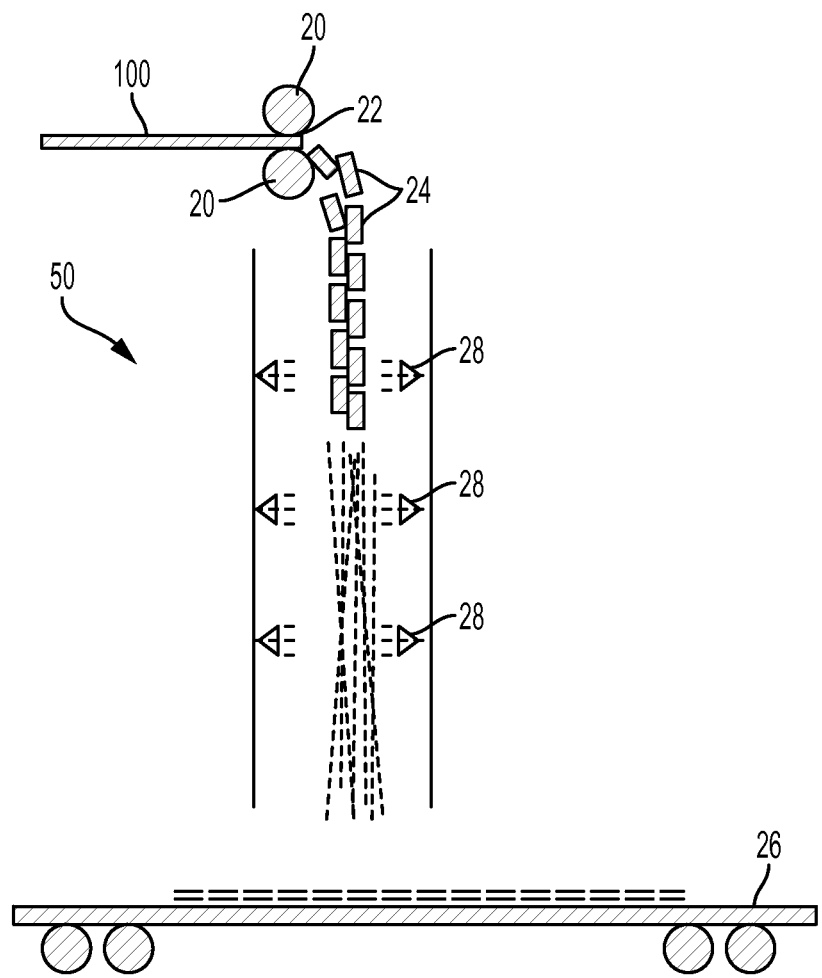
FIG. 4 is a schematic of a system for separating the filaments of a fiber tow, according to an embodiment.

With reference to FIG. 4, a system 50 is shown for splitting fiber tows 10. The system 50 may receive a tow 100 including coated filaments 16, or multiple such tows 10, for example, after the filaments 12 have gone through a polymer bath 18. The tow 100 including coated filaments 16 may be received by the system 50 in any suitable way. FIG. 4 shows the tow 100 received via rollers 20, however, others methods may be used, such as a conveyor. The system 50 may include a cutter or chopper 22 to chop the tow 100 into shorter tows or segments 24. The shorter segments 24 may have any length suitable for use in a composite component. In one embodiment, the segments 24 may have a length of 1 to 100 mm, or any sub-range therein. For example, the segments may have a length of 1 to 75 mm, 5 to 75 mm, 1 to 50 mm, 5 to 75 mm, 10 to 75 mm, 20 to 60 mm, 25 to 55 mm, 1 to 2 inches, or other sub-ranges. The chopper 22 may be a separate component, or may be incorporated into the rollers 20. The chopper 22 may be any device capable of cutting the tow 100 including coated filaments 16. The chopper 22 or chopper materials may vary depending on the type of fiber in the tow, such as carbon fiber, glass fiber, polymer fiber, etc.

After the tow 100 including coated filaments 16 is chopped into shorter segments 24, the segments 24 may fall to a receiving surface 26, below. The receiving surface 26 may be stationary or it may be moving. For example, the surface 26 may be a conveyor belt. One or more energy sources 28 may be arranged or configured to transfer energy to the segments 24 of the coated tow 16 as they fall to the receiving surface 26. In one embodiment, the energy source(s) 28 may be a heat source. Any source of heat that is sufficient to cause a change in dimension of polymer 14 (described above) may be used as a heat source. Non-limiting examples may include infrared heaters, resistance heaters, inductive heaters, convective heaters, flame heaters, an open or continuous furnace, or others. In one embodiment, the heat source(s) may heat the segments 24 to a temperature at which the polymer 14 changes shape (e.g., shortens in length and expands in thickness/radius). For example, the segments may be heated to a temperature of 50° C. to 250° C., or any sub-range there, such as 80° C. to 200° C.

In another embodiment, the energy source(s) 28 may be an electromagnetic radiation source. As used herein, an electromagnetic radiation (EM) source may be referred to as a light source, even if the EM source is not visible light. In one embodiment, the light source may be a UV light source (e.g., having a wavelength of about 400 nm to 100 nm). However the light source may emit any type of light or EM radiation that can cause a change in dimension of polymer 14. Other examples of light sources may be X-ray, visible light, infrared, gamma ray, microwaves, or radio waves.

In at least one embodiment, there may be a plurality of energy sources 28. The energy sources may be positioned such that they surround the falling segments 24 in a plane (e.g., in a circle or square). Alternatively, the energy sources 28 may be spaced apart vertically such that the segments 24 receive energy continuously or intermittently as they fall. In another embodiment, the energy sources 28 may both surround the falling segments 24 and be spaced vertically, for example, forming a column around the segments (e.g., cylindrical or square). Regardless of the configuration of the energy sources 28, they may be configured to transfer sufficient energy (e.g., heat or light) to the coated segments 24 that the polymer 14 coating at least a portion of the filaments 12 changes shape as described above (e.g., shortens and becomes thicker).

Figure 5:
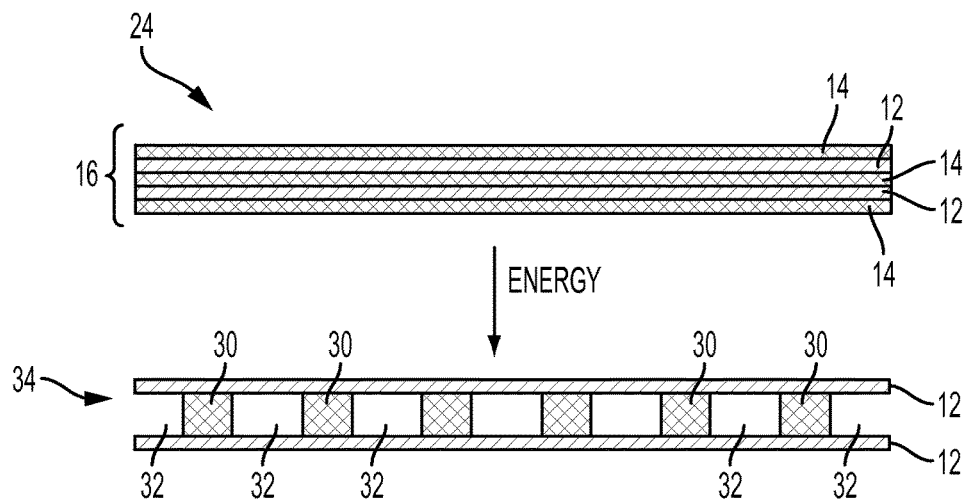
FIG. 5 is a schematic of a fiber tow including polymer-coated filaments separating in response to exposure to an energy source, according to an embodiment.

With reference to FIG. 5, a schematic demonstrating the change in shape of the polymer 14 coating the filaments 12 is shown. When the polymer 14 receives sufficient energy (e.g., heat or light), it may shrink or reduce in length (axial direction) and expand or increase in thickness (radial direction). As shown in FIG. 5, length may be defined in a direction parallel to the filaments 12 (e.g., horizontal in FIG. 5) and thickness may be defined in a direction perpendicular to the filaments 12 (e.g., vertical in FIG. 5). As a result of the reduction in length, the polymer 14 may separate into smaller, spaced apart, discontinuous portions 30. The separation of the polymer 14 into smaller, thicker portions 30 may create gaps 32 between the filaments.

Accordingly, by the time the fiber tow lands on the receiving surface 26 (e.g., conveyor belt), it may be split into shorter segments 24 and the segments 24 may be split into individual filaments 12. The filaments 12 may be connected to each other through portions 30 of polymer 14, but with gaps 32 formed therebetween due to the change in shape of the polymer 14. In one embodiment, the segments 24 may expand from their original diameter to a separated segment 34 having an expanded diameter. The expanded diameter may be 25% greater or more than the original diameter, for example, at least 50%, 100%, 150%, 200% or greater than the original diameter. The gaps 32 may improve wet-out of the filaments 12 in a subsequent molding process, such as an SMC molding process. The gaps 32 may allow a resin or other liquid to better impregnate the filaments 12 by creating space between the filaments 12 for the resin to flow. The shape change of the polymer 14 may also cause the filaments to completely separate from each other, for example, by detaching from the polymer portions 30. The detached filaments may have even greater space or access for resin to flow compared to those connected by polymer 14, thereby greatly improving wet-out. Improved wet-out may improve the properties of the composite component, such as the load transfer between the matrix and the fibers.

As a result of falling from the chopper 22 to the receiving surface 26, the segments 24 and filaments 12 may be randomly oriented when they land on the receiving surface 26. These filaments may be transferred to another system for incorporating the filaments into a composite component, for example, a fiber reinforced SMC component (e.g., carbon fiber). In another embodiment, the receiving surface 26 may form part of a SMC process. For example, the receiving surface 26 be a carrier film having a resin applied thereon. Therefore, the split filaments 12 may fall directly onto the resin-carrying film and a second carrier film having a resin applied thereon may be applied on top of the filaments to form a fiber reinforced SMC material (e.g., carbon fiber). The SMC material may be compacted (e.g., by rollers) and stored for later use, such as on a take-up roll. Alternatively, the SMC material may be transported for immediate or semi-immediate further processing, such as a molding operation.

Figure 6:
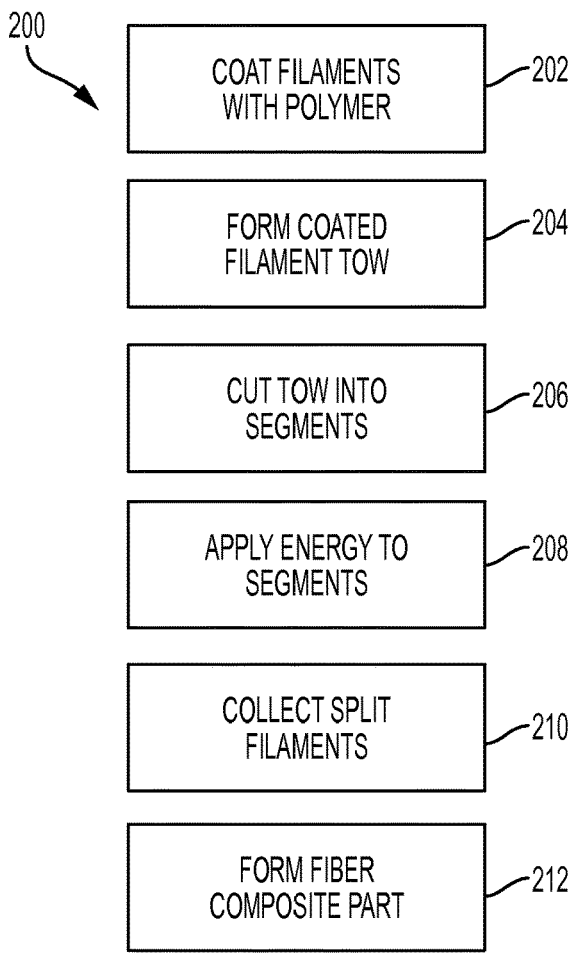
FIG. 6 is a flowchart of a method for separating the filaments of a fiber tow, according to an embodiment.

With reference to FIG. 6, a flowchart 200 is shown describing a method for splitting up a fiber tow. As described above, the fiber tow may be carbon fiber or other types of fiber, such as glass, ceramic, polymer, or others. In step 202, the fiber tow individual filaments may be coated with a polymer. As described above, the coating may be done by passing the filaments through a bath of the polymer, by dipping or immersing the filaments in the polymer, by spraying the polymer onto the filaments, or by any other suitable method. The filaments may be completely coated, in that each filament in the tow is completely coated or substantially completely coated. However, only a portion of the filaments may be coated and/or only a portion of each filament may be coated.

As described above, step 202 may be performed prior to the filaments being bundled or wound into a final tow. For example, step 202 may occur after the filaments have been carbonized and before a sizing is applied. Alternatively, the polymer coating may replace the sizing. Accordingly, in step 204, the coated filament may be bundled to form a tow, for example, by winding onto a spool or bobbin.

In step 206, the tow including coated filaments may be cut or chopped in to shorter or smaller segments. The shorter segments may have any length suitable for use in a composite component. In one embodiment, the segments may have a length of 1 to 100 mm, or any sub-range therein. For example, the segments may have a length of 1 to 75 mm, 5 to 75 mm, 1 to 50 mm, 5 to 50 mm, or other sub-ranges. The cutting may be performed using any suitable tool or equipment, such as a rolling chopper or opposing blades.

In step 208, the coated shorter segments may be exposed to or receive energy to cause the polymer coating to shrink in length and expand in thickness (as described above). Accordingly, the coated segments may change their shape independent of the filaments (e.g., the change in shape of the polymer is not caused by the filaments or any force or energy applied thereto, such as tension/compression or heat). The energy may be heat or a type of electromagnetic (EM) radiation. The energy may be provided by one or more energy sources, such as heaters of EM sources. Any type of heater may be used, such as infrared heaters, resistance heaters, inductive heaters, convective heaters, flame heaters, or others. The segments may be heated by placing them in or transporting them through a heated area, such as a static or a continuous/conveyor furnace. For example, the segments may be heated to a temperature of 50° C. to 250° C., or any sub-range there, such as 80° C. to 200° C. If EM radiation is used, the energy source may any type of EM radiation source, such as UV, visible light, X-ray, infrared, gamma ray, microwave, or radio wave. The energy may be received by the segments while they are moving or while they are static. For example, the energy may be received as they fall from a chopper, as shown in FIG. 4, of the energy may be applied while the segments are at rest on a surface. As a result of the energy being applied, the polymer coating on the segments may change shape and cause the filaments to split or separate from each other. The split may be complete, such that the filaments are completely separated from each other, or the filaments may be connected as tow segments but have a plurality of gaps formed therebetween by the polymer.

In step 210, the separated or split filaments may be collected, for example, for use in a fiber reinforced composite. The split filaments may be collected on a moving surface, such as a conveyor belt. In one embodiment, the split filaments may be collected on a carrier film having resin disposed thereon as part of a sheet molding compound process. The split filaments may also be collected and stored for later use. In step 212, the split fibers may be used to form a fiber reinforced composite part or component. Step 212 and step 208 may overlap, for example, if the filaments are collected as part of a SMC process onto a carrier film, described above.

Accordingly, embodiments of a system and method for splitting a fiber tow are disclosed. The fiber tow may be separated or split into individual filaments without mechanically separating them. This may reduce the amount of damage to the filaments during the splitting process, resulting in higher quality filaments. The fiber tow may be a carbon fiber tow, however, other types of fiber tows may be split using the disclosed system and method. The disclosed system and method may allow carbon tows to be more completely split than mechanical methods and may address some of the challenges specific to carbon tows, such as their generally smaller diameter compared with glass fibers and sizing materials that may be coated on the carbon fiber surface. The disclosed system and method may be used to produce any type of fiber reinforced component, such as fiber reinforced SMC components. In one embodiment, the system and method may be used to form vehicle components. For example, the system and method may be used to form decklids, hoods, bumpers, or other parts.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of separating filaments coated with a polymer in a fiber tow, comprising:
    cutting the fiber tow into segments;
    dropping the segments such that the segments fall in a vertical direction; and
    as the segments fall, exposing the segments to first energy sources aligned in a first plane orthogonal to the vertical direction and second energy sources aligned in a second plane vertically spaced from and parallel to the first plane.

2. The method of claim 1, wherein the filaments are carbon fiber filaments.

3. The method of claim 1, wherein the first and second energy sources are heat sources selected from the group consisting of a flame heater and a furnace.

4. The method of claim 3, wherein the heat sources heat the segments to a temperature of 50° C. to 250° C.

5. The method of claim 1, wherein the energy source is adapted to emit energy selected from the group consisting of X-rays, gamma rays, microwaves, and radio waves.

6. The method of claim 1 further comprising dropping the fiber tow segments onto a receiving surface that is a moving receiving surface.

7. The method of claim 6, wherein the receiving surface is a first carrier film having a resin applied thereon, and wherein the method further comprises:
    applying a second carrier film having a resin applied thereon to the segments.

8. The method of claim 7 further comprising:
    forming a sheet molding compound including the segments; and
    compacting the SMC material including the segments with a roller.

9. The method of claim 1, wherein during the dropping, the segments receive energy intermittently as they fall from the first energy sources to the second energy sources.

10. The method of claim 1, wherein during the dropping, the segments receive energy continuously as they fall from the first energy sources to the second energy sources.

11. The method of claim 1, wherein during the dropping, the polymer splits into spaced apart, discontinuous portions.

12. The method of claim 11, wherein the spaced apart, discontinuous portions and adjacent filaments define gaps within the segment.

13. The method of claim 1, wherein during the dropping, the polymer expands at least 25% in the direction generally perpendicular to the adjacent filaments such that a diameter of a segment expands at least 25% when the polymer is exposed to the energy source.

14. The method of claim 1, wherein during the dropping, a filament is detached from an adjacent filament.

15. A method comprising:
    cutting and dropping polymer-coated segments from a tow;
    as the segments fall, intermittently exposing the segments to heaters such that a segment
        is exposed to a first plurality of heaters at a first fall location,
        is not exposed to a heater at a second fall location vertically below the first fall location, and
        is exposed to a second plurality of heaters at a third fall location vertically below the second fall location.

16. A method of separating polymer-coated filaments of a fiber tow, comprising:
    passing the fiber tow through a roller-integrated cutter such that
        the fiber tow is cut into segments, and
        the segments fall vertically from the roller-integrated cutter;
    as the segments fall, exposing the segments to a first plurality of at least four energy sources that define a square about the vertically-falling segments and a second plurality of energy sources vertically offset from the first plurality.

* * * * *